(12) United States Patent
Sawai

(10) Patent No.: US 6,587,681 B1
(45) Date of Patent: Jul. 1, 2003

(54) MAIL RECEPTION NOTIFYING SYSTEM AND MAIL RECEPTION NOTIFYING METHOD

(75) Inventor: Koichi Sawai, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 08/952,403

(22) PCT Filed: Mar. 12, 1997

(86) PCT No.: PCT/JP97/00776
§ 371 (c)(1),
(2), (4) Date: Feb. 17, 1998

(87) PCT Pub. No.: WO97/34405
PCT Pub. Date: Sep. 18, 1997

(51) Int. Cl.[7] ................................. H04M 1/65
(52) U.S. Cl. ..................... 455/413; 455/412; 379/67; 379/88.12; 379/88.19
(58) Field of Search ................. 455/412, 413, 455/422, 514, 414, 426, 515, 466, 560, 567, 550, 575, 90; 379/93.24, 88.25, 88.27, 88.28, 88.12, 88.13, 88.15, 93.74, 89

(56) References Cited

U.S. PATENT DOCUMENTS

| | | | | |
|---|---|---|---|---|
| 4,873,713 A | * | 10/1989 | Yamanouchi et al. | 379/67 |
| 5,177,780 A | * | 1/1993 | Kasper et al. | 379/88.12 |
| 5,313,515 A | * | 5/1994 | Allen et al. | 455/413 |
| 5,418,835 A | * | 5/1995 | Frohman et al. | 340/7.22 |
| 5,448,622 A | * | 9/1995 | Huttunen | 455/551 |
| 5,471,204 A | * | 11/1995 | Kudoh et al. | 340/825.44 |
| 5,590,178 A | * | 12/1996 | Murakami et al. | 379/96 |
| 5,604,788 A | * | 2/1997 | Tett | 455/412 |
| 5,625,670 A | * | 4/1997 | Campana, Jr. et al. | 455/412 |
| 5,638,424 A | * | 6/1997 | Denio et al. | 379/67 |
| 5,754,628 A | * | 5/1998 | Bossi et al. | 379/88.12 |
| 5,781,857 A | * | 7/1998 | Hwang et al. | 340/7.29 |
| 5,797,098 A | * | 8/1998 | Schroeder et al. | 379/355.05 |
| 5,802,166 A | * | 9/1998 | Garcia et al. | 379/372 |
| 5,802,466 A | * | 9/1998 | Gallant et al. | 455/413 |
| 5,819,172 A | * | 10/1998 | Campana, Jr. et al. | 455/412 |
| 5,844,969 A | * | 12/1998 | Goldman et al. | 379/93.24 |
| 5,850,519 A | * | 12/1998 | Vazana | 379/142.01 |
| 5,867,776 A | * | 2/1999 | Noda | 455/186.1 |
| 5,884,160 A | * | 3/1999 | Kanazaki | 455/413 |
| 5,889,839 A | * | 3/1999 | Beyda et al. | 379/88.12 |
| 5,894,506 A | * | 4/1999 | Pinter | 379/88.23 |
| 5,944,786 A | * | 8/1999 | Quinn | 379/88.12 |
| 5,946,636 A | * | 8/1999 | Uyeno et al. | 455/566 |
| 5,987,317 A | * | 11/1999 | Venturini | 455/412 |
| 5,995,595 A | * | 11/1999 | Hickey et al. | |
| 6,006,087 A | * | 12/1999 | Amin | 455/413 |
| 6,032,039 A | * | 2/2000 | Kaplan | 455/413 |
| 6,212,265 B1 | * | 4/2001 | Duphorne | 379/142 |

FOREIGN PATENT DOCUMENTS

| | | |
|---|---|---|
| JP | 2-305164 A | 12/1990 |
| JP | 4-362826 A | 12/1992 |
| JP | H5-207055 | 8/1993 |
| JP | 5-252199 A | 9/1993 |
| JP | H5-327762 | 12/1993 |
| JP | 5-327893 A | 12/1993 |
| JP | 6-125393 A | 5/1994 |
| JP | 7-099508 A | 4/1995 |

* cited by examiner

Primary Examiner—Daniel Hunter
Assistant Examiner—Pablo N. Tran
(74) Attorney, Agent, or Firm—Brinks Hofer Gilson & Lione

(57) ABSTRACT

When the telephone number of digital portable telephone A is notified to reception notifying apparatus 3 (S101), the telephone number is stored (S102), and is forwarded to digital portable telephone B (S103). Next, when digital portable telephone B transmits a CALL SETUP signal and a sending number to digital portable telephone A (S104, S105), digital portable telephone A transmits a CALL PROC signal and an ALERT signal to digital portable telephone B (S106–S109). After that, information indicating that the busy line display is ON is forwarded to reception notifying apparatus 3 (S110), and the telephone number is deleted (S111). Furthermore, reception notifying apparatus 3 transmits a voice guidance to digital portable telephone A (S114).

18 Claims, 7 Drawing Sheets

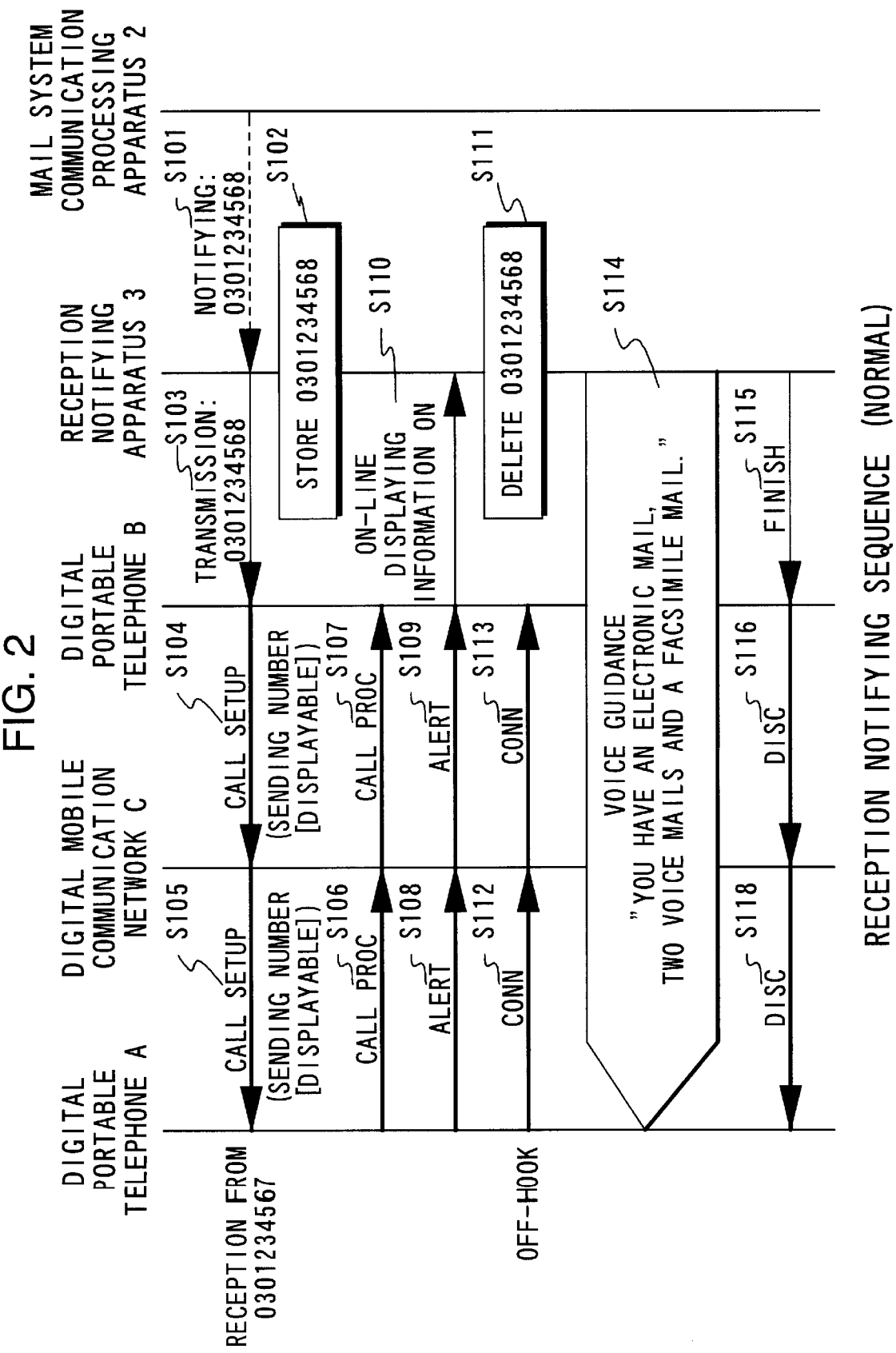

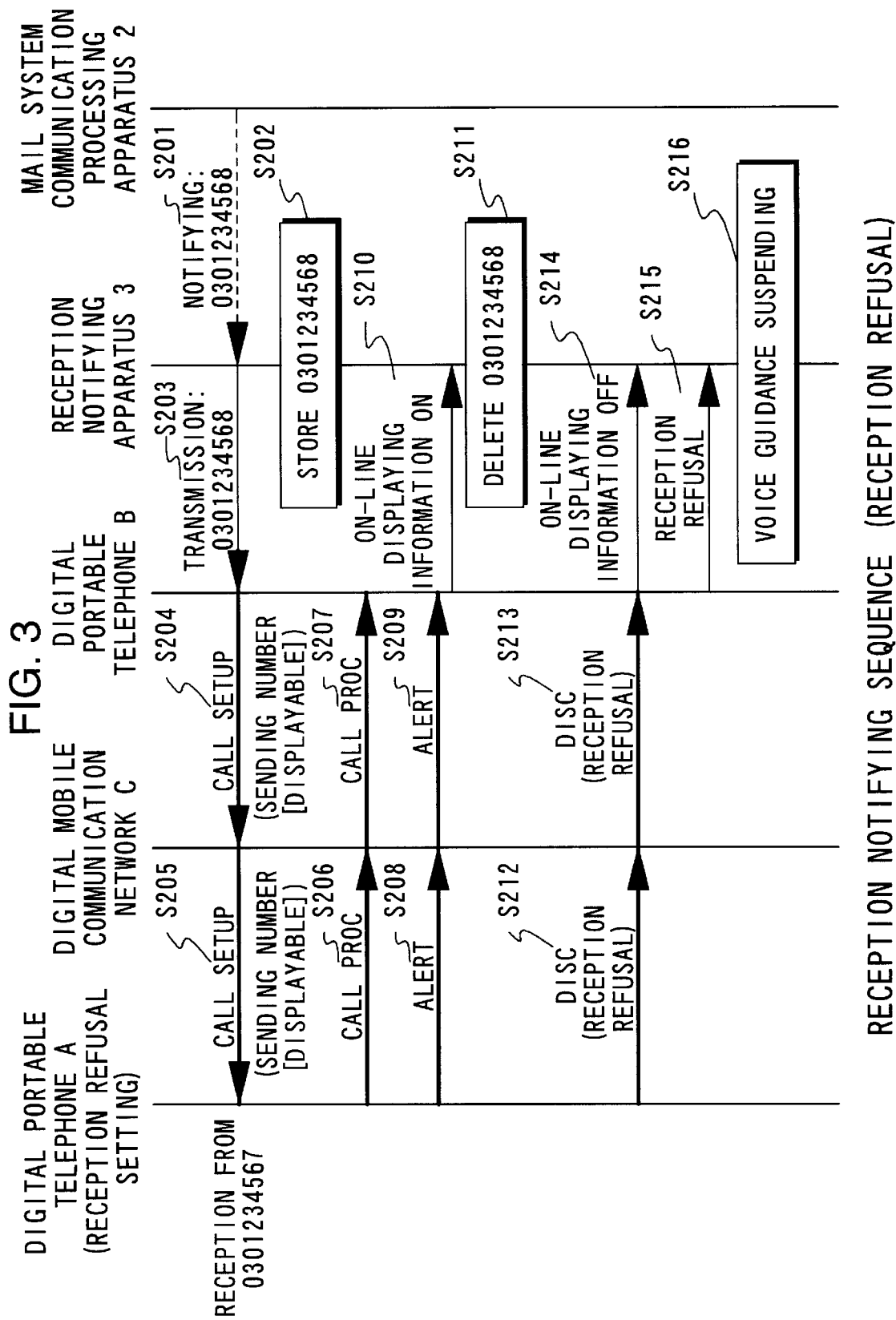

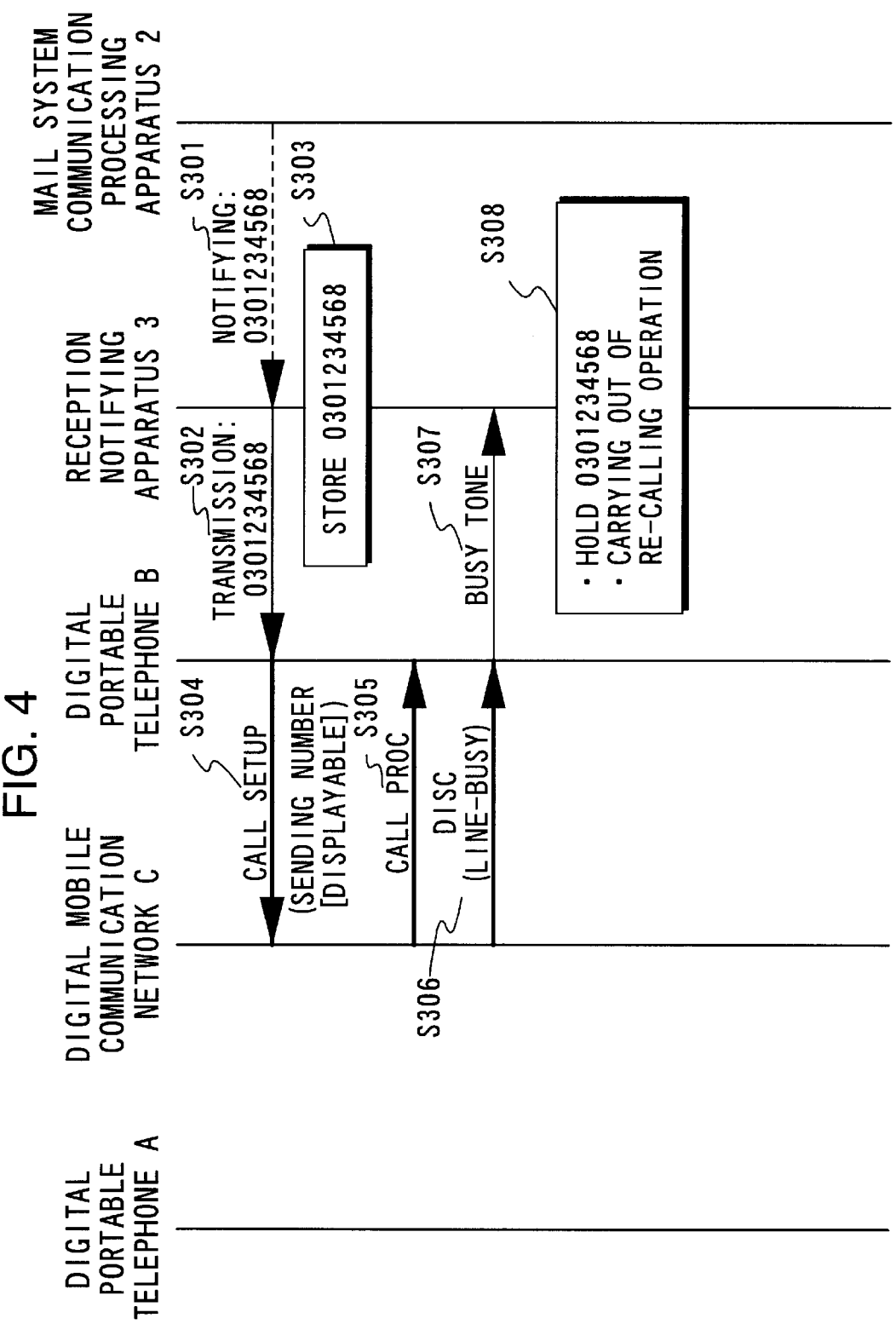

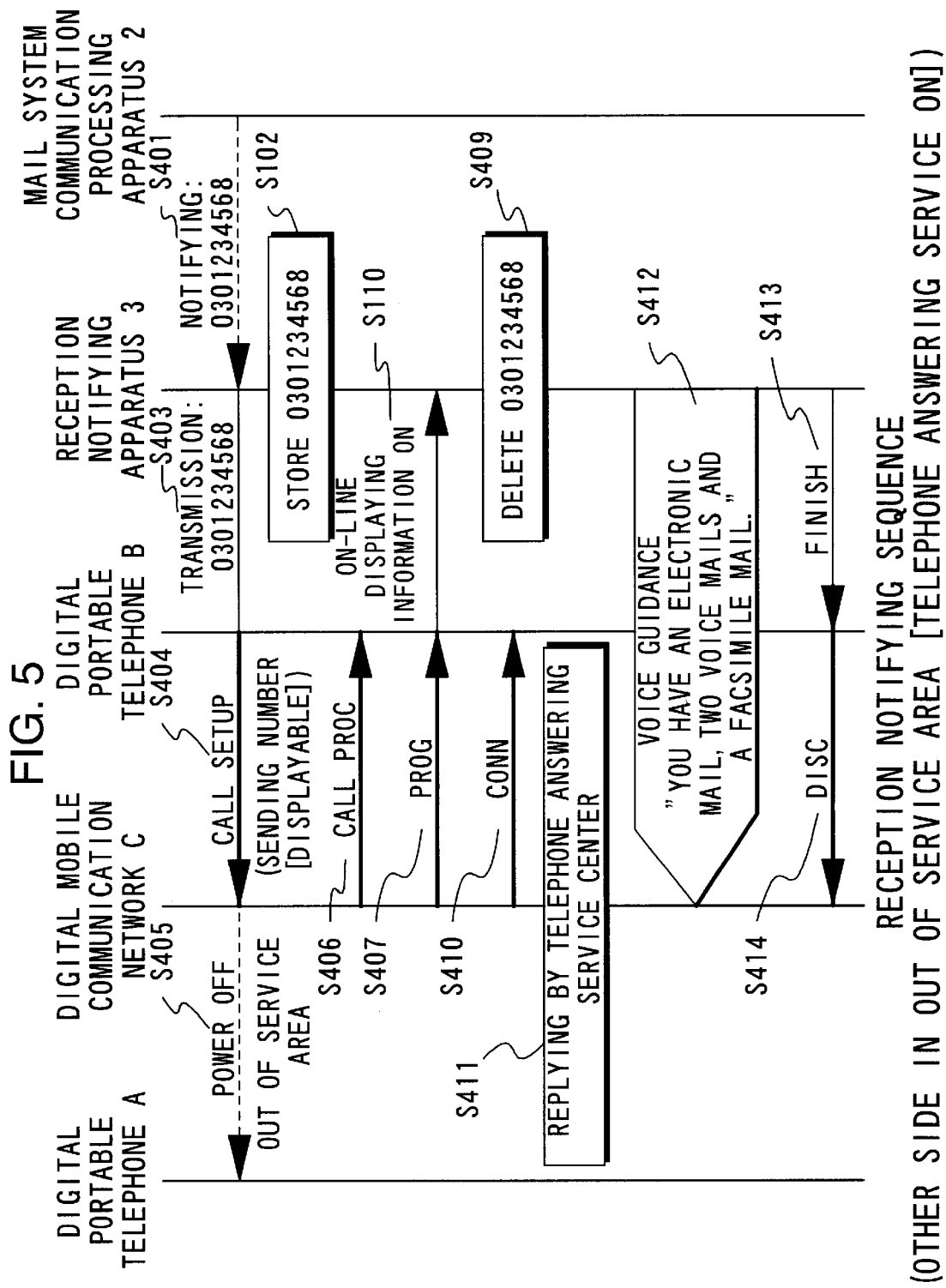

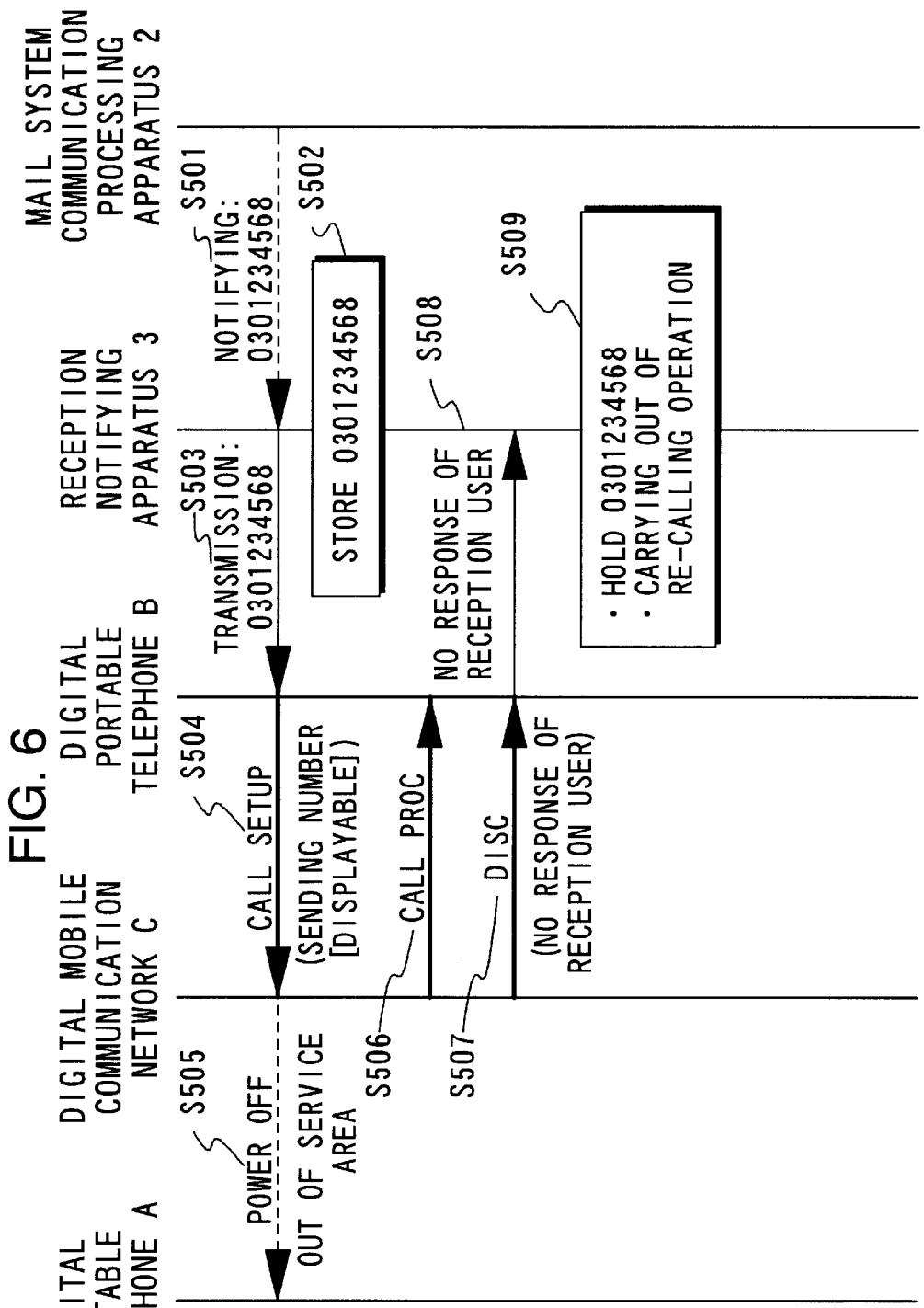

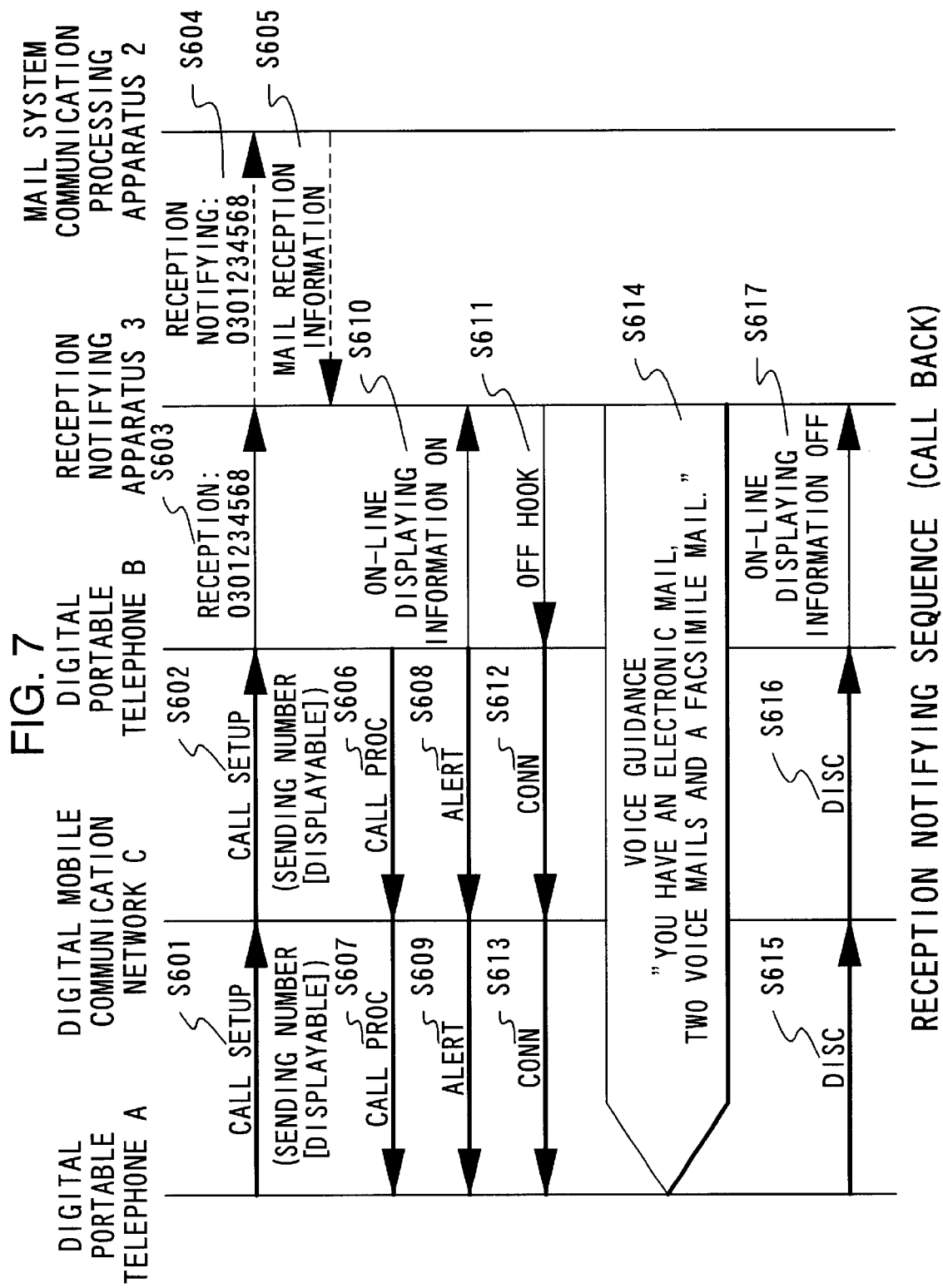

MAIL RECEPTION NOTIFYING SYSTEM AND MAIL RECEPTION NOTIFYING METHOD

This Application is a 371 of PCT/SP97/00776 filed Mar. 12, 1999.

TECHNICAL FIELD

The present invention relates to a mail reception notifying system and a mail reception notifying method which are suitable for providing notification by means of a voice to a user of the receipt of various types of mails, such as electrical mails (E-mails), voice mails and facsimile mails.

BACKGROUND ART

In the BBS (Britain Board System) system, in which a user uses a personal computer with a modem, for example, the personal computer is connected as a terminal to a host computer through a telephone line, to form a network. Information is then exchanged via electronic mails between users over the network. In this electronic mail service, a file made off-line in advance is transmitted to the host computer along with the ID (identification code) of the user who is to receive the file. The host computer then stores the file after associating it with the ID of the intended recipient. In order to read out the file subsequently, the recipient must access his personal mailbox, and download the file stored in the host computer. However, in BBS, the host computer does not normally page the terminal (personal computer) of the user. Accordingly, the user must regularly access his personal mailbox to judge whether or not he has received any electronic mail.

However, requiring the user to regularly access his mailbox is troublesome. Accordingly, there is available a reception notifying service which uses a radio calling apparatus, such as a pager. In the reception notifying service, when the host computer receives an electronic mail for a specific user, a reception message is displayed on the character display device of the pager.

However, the areas in which a pager is operable are limited to large cities such as Tokyo or Osaka in Japan. Thus, this type of electronic mail reception notifying service is problematic in that it cannot be employed throughout the whole country. Further, a radio calling apparatus (i.e. a pager) can be used for reception only, and cannot transmit a response to reception. Accordingly, this is problematic in that the sender cannot confirm with certainty that the mail he sent has been received by the recipient. In addition, while a radio calling apparatus (pager) displays the reception message using characters, it would be more convenient if the reception notifying message could be conveyed to the recipient by means of a voice.

Accordingly, a voice storing service is provided in mobile communications. In the voice storing service, when the line is busy or the call is unanswered, a voice storage apparatus at a telephone answering center records and stores voice messages, which can subsequently be retrieved. In this service, when a mobile station is sending or receiving a telephone call, the telephone answering center checks whether or not a message is stored in the voice storage apparatus. If a new message is stored, a signal is provided once the telephone call is terminated which indicates the presence of a new message. However, in this procedure, message notification is carried out only upon completion of a communication, i.e., only upon termination of a telephone call. Therefore, if the mobile station is not used to send or receive a telephone call, the user is not notified of the presence of a new message.

DISCLOSURE OF INVENTION

The present invention was developed in consideration of the above circumstances, and has as its objective the provision of a mail reception notifying system and a mail reception notifying method wherein it is possible to expand the area in which a mail reception notifying service can be employed, and to improve the utilization of the mail reception notifying service, and further, to provide notification of mail reception with certainty.

In this invention, a mail reception notifying system comprises of a mail communication processing apparatus for managing reception of mail, and a reception notifying apparatus for controlling communication apparatus on the host side which is capable of communicating with a portable telephone on the user side through a mobile communication network, wherein, said mail communication processing apparatus includes: a storage means for storing a combination of a mail ID and a telephone number corresponding to said mail ID; a telephone number searching means for searching the telephone number corresponding to the reception by referring to the stored contents of said storage means when the reception of said mail is detected; and a notifying means for notifying said reception notifying apparatus of the telephone number which is searched by said telephone number searching means and the reception of said mail, said reception notifying apparatus includes: a control means for controlling the communication apparatus of said host side to transmit the telephone number of said host side, and call the portable telephone of said user side based on the telephone number from said notifying means; a call detecting means for detecting that a call has come into existence between the portable telephone of the user side and the communication apparatus of said host side; and an output means for outputting a voice guidance which guides the reception of said mail to the portable telephone of said user side through the communication apparatus of said host side when said call detecting means detects that a call has come into existence.

Furthermore, in the above mail reception notifying system, said reception notifying apparatus includes of a storage means which stores said telephone number that is notified from said mail communication processing apparatus, and a deleting means which deletes said telephone number that is stored in said storage means after recognizing that the portable telephone of said user side displayed the telephone number of said host side.

Furthermore, in the above mail reception notifying system, said reception notifying apparatus includes of a reception refusal detecting means which detects that the portable telephone of said user side refused reception, and said control means controls to suspend the output of said voice guidance when said reception refusal detecting means detects that reception is refused.

Furthermore, in the above mail reception notifying system, said reception notifying apparatus includes of a busy line detecting means which detects that the portable telephone on said user side is busy.

Furthermore, in the above mail reception notifying system, said mobile communication network includes of:

a first judgment means for judging whether the portable telephone of said user can communicate or not;

a second judgment means for judging whether the portable telephone of said user corresponds to a specific portable telephone by detecting a call from the communication apparatus of said host side; and voice storage means for storing said voice guidance which is transmitted from the communication apparatus of said host side, in the case where said first judging means judges that the portable telephone of said user side cannot communicate, and the portable telephone of said user side corresponds to a specific portable telephone; and said reception notifying apparatus consists of;

a judgment result detecting means for detecting that the portable telephone of said user side cannot communicate, and that a judgment was made that the portable telephone of said user side does not correspond to said specific portable telephone, wherein said control means carries out recalling to the portable telephone of said user side based on the telephone number from said notifying means when said judgment result detecting means detects that the portable telephone of said user side cannot communicate and a judgment has been made that the portable telephone of said user side does not correspond to said specific portable telephone, and controls the communication apparatus of said host side to retransmit the telephone number of said host side.

In addition, this invention provides a mail reception notifying system which comprises a mail communication processing apparatus which manages reception of mail, and a reception notifying apparatus which controls the communication apparatus on a host side that can communicate with a portable telephone of the user side through a mobile communication network, wherein said mail communication processing apparatus consists of:

a storage means for storing a combination of a mail ID and a telephone number corresponding to the mail ID;

a generating means for generating reception information which indicates the reception condition of mail corresponding to a telephone number when said telephone number is notified from said reception notifying apparatus; and a notifying means for notifying said reception information to said reception notifying apparatus, and said reception notifying apparatus consists of:

a notifying means for notifying said mail communication processing apparatus of the telephone number of the portable telephone of said user side when the portable telephone of said user side notifies said telephone number thereof;

a call detecting means for detecting that a call comes into existence between the portable telephone of the user side and the communication apparatus of said host side; and an output means for outputting voice guidance which guides the reception of said mail based on said reception information to the portable telephone of said user side through the communication apparatus of said host side when said call detecting means detects that a call has come into existence.

Furthermore, in this invention, a mail reception notifying method which notifies a portable telephone on the user side of reception of a mail from a communication apparatus on the host side through a mobile communication network, wherein the procedure of said mail reception notifying method includes:

a first step for storing a combination of a mail ID and a telephone number corresponding to the mail ID;

a second step for searching a telephone number corresponding to a reception with reference to said stored contents in said first step when said reception of said mail is detected;

a third step for calling based on said telephone number to the portable telephone of said user side, and for controlling the communication apparatus of said host side to transmit a telephone number of said host side;

a forth step for detecting that a call comes into existence between the portable telephone of the user side and the communication apparatus of said host side; and a fifth step for outputting a voice guidance which guides the reception of said mail from the communication apparatus of said host side to the portable telephone of said user side when the call comes into existence.

BRIEF DESCRIPTION OF DRAWINGS

FIG. 2 is a sequence diagram showing a general reception notifying sequence in the embodiment.

FIG. 3 is a sequence diagram showing a reception notifying sequence when the device has been set to reject a given reception in the embodiment.

FIG. 4 is a sequence diagram showing a reception notifying sequence when the line is busy at the receiving end in the embodiment.

FIG. 5 is a sequence diagram showing the reception notifying sequence in the case where a telephone answering service is employed when the recipient is out of the service area in the embodiment.

FIG. 6 is a sequence diagram showing a reception notifying sequence in the case where a telephone answering service is not employed when the recipient is out of the service area in the embodiment.

FIG. 7 is a sequence diagram showing a reception notifying sequence in the case where a call back service is employed in the embodiment.

BEST MODE FOR CARRYING OUT THE INVENTION

Figure 1:
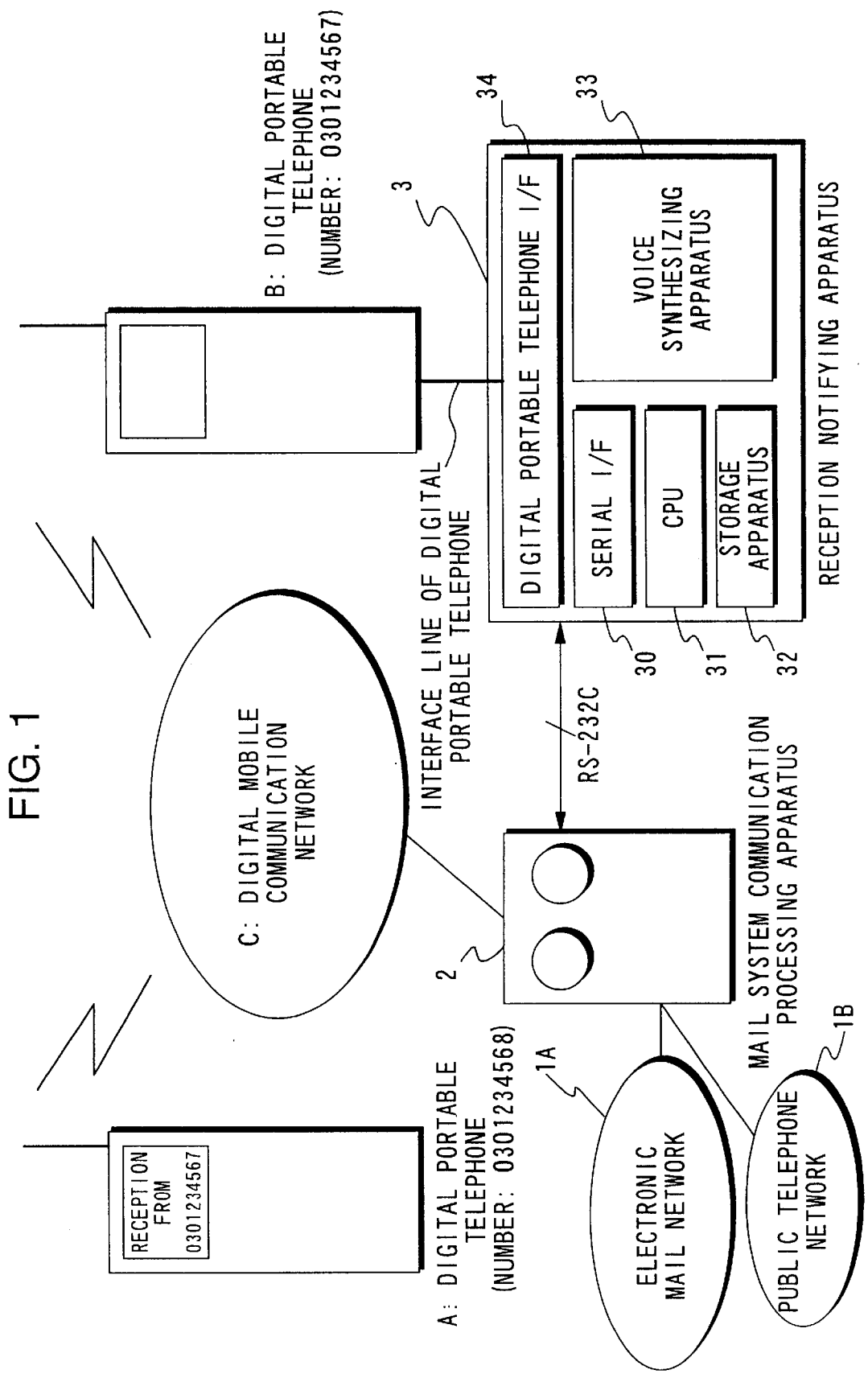
FIG. 1 is a block diagram showing the structure of a mail reception notifying system of an embodiment in this invention.

The best mode for carrying out the present invention will now be described with reference to the figures.

1. STRUCTURE OF EMBODIMENT

FIG. 1 is a block diagram showing the structure of a mail reception notifying system of an embodiment in this invention. In FIG. 1, A is a digital portable telephone on the user's side, and B is a digital portable telephone on the host side. Digital portable telephones A, B are connected to digital mobile telephone network C. Reception notification of various mails, such as electronic mails, voice mails and facsimile mails, is carried out between digital portable telephones A, B through digital mobile telephone network C. Digital portable devce which display telephones A, B respectively include a display device that displays predetermined characters and symbols.

Digital mobile communication network (communication network) C includes of a switching apparatus which manages transmission information, such as on-line display information, out-of-service-area display information, and the like. The on-line display information indicates whether or not the digital portable telephone of a subscriber is in use, while the out-of-service-area display information indicates that the digital portable telephone of a subscriber is outside the service area, or is turned off so that communication is not possible. The switching apparatus is connected to each base station, and the transmission information is exchanged between each base station through the switching apparatus. Furthermore, digital mobile communication network C includes of a storage apparatus which stores voice messages. When the digital portable telephone of the subscriber is in use, or cannot be communicated with, then a voice message is stored in the storage apparatus.

Furthermore, reference number 1A is an electronic mail network. A plurality of computers are connected to electronic mail network 1A through modems or leased lines. Reference number 2 is a mail system communication processing apparatus (mail communication processing apparatus) which includes of a host computer, and is connected to electronic mail network 1A, public telephone network 1B and a digital mobile communication network. This mail system communication processing apparatus 2 includes a large capacity storage apparatus, in which mailboxes of registered users are formed. The mailboxes are separated by mail type, i.e., an electronic mail, a voice mail or a facsimile mail. For example, a file sent with an electronic mail is transmitted to the mailbox by uploading, and then received from the mailbox by downloading. In addition, the voice mail and the facsimile mail are also stored in the storage apparatus.

The telephone numbers of a service user's digital portable telephones are stored in the aforementioned storage apparatus in association with the user's mail ID, and a notification of mail reception is provided to a telephone number stored in the storage apparatus. Therefore, when a mail of of the types is received, the telephone number of the user who is to receive a reception notice can be determined based on the mail ID which is associated with the received message.

Furthermore, reference number 3 is a reception notifying apparatus which is connected to mail system communication processing apparatus 2 and digital portable telephone B. Reception notifying apparatus consists of serial I/F 30, CPU 31, storage device 32, voice synthesizing device 33 and digital portable I/F 34. CPU (control means and delete means) 31 controls each device of reception notifying apparatus 3. Serial I/F 30 exchanges data in RS-232C format between mail system communication processing apparatus 2 and reception notifying apparatus 3. Storage apparatus (storage means) 32 consists of a hard disk or RAM (Random Access Memory) and so on, and stores telephone numbers which are transferred from mail system communication processing apparatus 2. A telephone number stored in storage apparatus 32 is deleted at a predetermined timing under the control of CPU 31. Voice synthesizing apparatus (voice guidance generating means) 33 generates voice guidance information for notifying the user of reception status by voice under the control of CPU 31. Furthermore, digital portable telephone I/F 34 exchanges data with digital portable telephone B.

Herein, if the reception of an electronic mail occurs for the user of digital portable telephone A, then mail system communication processing apparatus 2 detects the reception of the electronic mail, and notifies reception notifying apparatus 3 that an electronic mail has been received. After that, the reception notification is transmitted from reception notifying apparatus 3 to digital portable telephone B, and is transmitted from digital portable telephone B to digital portable telephone A.

2. OPERATION OF EMBODIMENT

Next, an explanation will be made of the operation of this embodiment with reference to FIG. 2–FIG. 7. In this embodiment, a file is transferred to mail system communication processing apparatus 2 through electronic mail network 1A, and an electronic mail is generated in the mailbox for the user of digital portable telephone A. Please note that here the telephone number of digital portable telephone A is [01234568], and the telephone number of digital portable telephone B is [01234567].

2-1. ORDINARY RECEPTION INFORMING SEQUENCE

First, an explanation will be made of the ordinary reception notifying sequence in the embodiment with reference to FIG. 2. In FIG. 2, when reception of an electronic mail occurs in mail system communication processing apparatus 2, mail system communication processing apparatus 2 reads out from the storage apparatus the telephone number which corresponds to the received message based on the ID on the electronic mail, and provides the telephone number to reception notifying apparatus 3 (step S101). In this embodiment, the e-mail message is received in the mailbox of the user of digital portable telephone A, so that the telephone number [0301234568] thereof is transmitted to reception notifying apparatus 3.

Having received the telephone number of digital portable telephone A, reception notifying apparatus 3 stores the telephone number [0301234568] in storage apparatus 32 (step S102), and transmits the telephone number [0301234568] to digital portable telephone B (step S103). The reason that the telephone number is stored in this way is because reception notifying apparatus 3 can carry out re-calling, in cases where digital portable telephone A is busy (i.e., engaged) or cannot be communicated with.

Next, digital portable telephone B carries out calling control, and transmits a CALL SETUP signal and its telephone number, i.e. the sending number, to digital portable telephone A via digital mobile communication network C (steps S104, S105). The CALL SETUP signal is a signal indicating calling. The sending number in this case is the telephone number 031234567 of digital portable telephone B.

Having received the CALL SETUP signal, digital portable telephone A carries out reception control, and transmits a CALL PROC signal to digital portable telephone B via digital mobile communication network C (steps S106, S107). The CALL PROC signal indicates that the CALL SETUP signal is received. Based on the sending number from digital portable telephone B, digital portable telephone A displays "RECEPTION FROM 0301234567" on the display device thereof. The user already knows that "0301234567" is the telephone number on the host side, and therefore is able to know whether any mail has been received in his mailbox. Please note that in this case, digital portable telephone A is on-hook, i.e., the handset is not picked up. Therefore, it is possible for the user to know that an electronic mail has been received prior to establishing a call between digital portable telephones A and B.

Subsequently, digital portable telephone A transmits an ALERT signal to digital portable telephone B via digital mobile communication network C (steps S108, S109). This ALERT signal indicates that a call is being made to the user of digital portable telephone A. Having received the ALERT signal, digital portable telephone B notifies reception notifying apparatus 3 that the on-line display information is ON (step S110).

In this way, when the telephone number of digital portable telephone B is displayed on digital portable telephone A, and confirmation is made that calling is being carried out to the user of digital portable telephone A, reception notifying apparatus 3 deletes the telephone number [0301234568] which is stored in storage apparatus 32 of digital portable telephone B (step Sill). Therefore, unnecessary telephone numbers are deleted, and storage space is provided for storing new telephone numbers in storage apparatus 32.

Next, when the user of digital portable telephone A responds to the call and places digital portable telephone A in an off-hook state, a CONN signal requesting establishment of a line connection is transmitted to digital portable telephone B via digital mobile communication network C (steps S112, S113). Consequently, the line (or channel) is connected. Reception notifying apparatus 3 generates voice guidance by controlling voice synthesizing apparatus 33, and transmits the voice guidance to digital portable telephone A through digital portable telephone B and digital mobile communication network C after the telephone number is deleted (step S114). In this way, the generation of voice guidance is triggered by the ALERT signal. Please note that when the sending number is displayed on the display device of digital portable telephone A, the user of digital portable telephone A carries out communication by picking up digital portable telephone. As a result, it may be regarded that the call is established by detection of the ALERT signal. On the other hand, if the call is not established because reception is refused, then transmission of the voice guidance is suspended according to the reception notifying sequence for reception refusal, which will be described below.

The content of the voice guidance indicates that the types of received mails and the number of the received mail messages. In this embodiment, if one electronic mail is stored in the mailbox for the user of digital portable telephone A, a voice stating "you have one e-mail" is transmitted. Similarly, in the case where the user has received one electronic mail, two voice mails and one facsimile mail, as shown in FIG. 2, then a voice stating "you have one e-mail, two voice mails, and a facsimile mail" is transmitted. In this way, the user of digital portable telephone A can know the types and the number of received mail messages from the voice guidance.

Next, when the voice guidance transmission is completed, reception notifying apparatus 3 transmits a communication finishing request to digital portable telephone B (step S115). Digital portable telephone B receives the communication finishing request, and transmits a DISC signal indicating line disconnection to digital portable telephone A via digital mobile communication network C (steps S116, S117). Accordingly, this terminates the reception notifying sequence.

In this way, by means of this embodiment, it is possible to provide a notification of a mail reception by displaying the host's telephone number on digital portable telephone A. In addition, voice guidance can be used to provide details of the reception, such as the types and number of messages received.

2-2. RECEPTION NOTIFYING SEQUENCE FOR RECEPTION REFUSAL

In the system of digital portable telephones, there are some digital portable telephones which have a function known as "reception refusal". In the reception refusal, when a call is received from a specific telephone number, the line is disconnected before the call can be established. In this embodiment, suppose that portable telephone A is set to refuse reception from the telephone number of digital portable telephone B. An explanation will now be made of the reception notifying sequence in this case with reference to FIG. 3. Please note that in FIG. 3, the sequence in steps S201–S211, i.e., from reception to deletion of the telephone number of digital portable telephone A in reception notifying apparatus 3, is the same as that in steps S101–S111 (refer to FIG. 2) in the ordinary reception notifying sequence. Accordingly, an explanation thereof is omitted.

In this embodiment, the telephone number [301234567] of digital portable telephone B is pre-registered as a telephone number from which to refuse calls. Accordingly, digital portable telephone A transmits an ALERT signal, and then transmits a DISC signal to digital portable telephone B via digital mobile communication network C (steps S212, S213). As a result, the call is terminated. When digital portable telephone B detects the DISC, signal, it informs reception notifying apparatus 3 that the on-line display information is "OFF" (step S214), and then informs reception notifying apparatus 3 that reception is refused. When reception notifying apparatus 3 detects the information that the on-line display information is "OFF", CPU 31 controls the various compositional elements to suspend voice guidance. Consequently, voice synthesizing apparatus 33 does not generate voice guidance.

According to this embodiment, even if the device is set to refuse reception from a given telephone number, it is still possible for the user to know that an incoming mail has occurred. Furthermore, if a call back service is used, then the user can know the details of the reception status. Further, since voice guidance is suspended in this embodiment when reception is refused, there is no unnecessary processing carried out.

2-3. LINE-BUSY RECEPTION NOTIFYING SEQUENCE

Next, an explanation will be made with reference to FIG. 4 of the reception notifying sequence when digital portable telephone A is in use. Please note that the sequence in FIG. 4 from reception in mail system communication processing apparatus 2 to transmission of the CALL SETUP signal in digital portable telephone B (steps S301–S304) is the same as that in steps S101–S104 (see FIG. 2) in the ordinary reception notifying sequence. Accordingly, an explanation of steps (S301–S304) will be omitted here.

When digital mobile communication network C receives a CALL SETUP signal from digital portable telephone B (step S304), digital mobile communication network C detects that digital portable telephone A is in use. In this case, digital portable telephone A cannot be communicated with. Therefore, digital mobile communication network C itself transmits a CALL PROC signal to digital portable telephone B (step S305). Digital mobile communication network C subsequently transmits to a digital portable telephone B a DISC signal and the information that the line is busy (step S306). Having received the notice that digital portable telephone A is in use, digital portable telephone B transmits a busy tone to reception notifying apparatus 3 (step S307). Next, reception notifying apparatus 3 detects the busy tone, and stores the telephone number in storage apparatus 32 of digital portable telephone B. Subsequently, reception notifying apparatus 3 carries out a recalling operation at fixed intervals (step S308). Additionally, it is also acceptable to terminate the recalling operation after a predetermined number of trials.

In this embodiment, a reply to the ALERT signal, which indicates that the telephone number of digital portable telephone A is displayed on digital portable telephone B, as shown in FIG. 2, is not supplied (steps S108, S109). As a result, the telephone number of digital portable telephone A is not deleted in reception notifying apparatus 3, and the calling operation is carried out again (step S308). When a reply to the ALERT signal is supplied to digital portable telephone B from digital mobile communication network C, the procedure goes to step Sill shown in FIG. 2, and the procedures from step S112 to step S118 are carried out.

In this way, in this embodiment, even if the digital portable telephone receive a reception notification is busy, the recalling operation is carried out repeatedly so that the reception notification is transmitted with certainty.

2-4. RECEPTION NOTIFYING SEQUENCE WHEN RECIPIENT IS OUTSIDE SERVICE AREA AND TELEPHONE ANSWERING SERVICE IS AVAILABLE

In digital mobile communication network C, communication is not possible with a user who is outside the service area, or who has switched off the power on his digital portable telephone. For this reason, a storage apparatus is provided in digital mobile communication network C, so that a voice or data from the sending side can be temporarily stored therein. A telephone answering service is thereby provided by transmitting the voice or data stored in the storage apparatus from digital mobile communication network C to the intended recipient.

In this embodiment, the telephone answering service is available for digital portable telephone A, which is outside the service area, or has been turned off. That is, the telephone number of digital portable telephone A is registered in the storage apparatus of the switching apparatus in digital mobile communication network C as a number for which the telephone answering service is being carried out. An explanation will now be made of the reception notifying sequence in this case with reference given to FIG. 5. Please note, however, that the sequence in FIG. 5 from reception in mail system communication processing apparatus 2 to the transmission of the CALL SETUP signal in digital portable telephone B (steps S401–S404), is the same as that in steps S101–S104 (see FIG. 2) of the ordinary reception notifying sequence, so that an explanation of thereof will be omitted here.

When digital mobile communication network C receives a CALL SETUP signal from digital portable telephone B (step S404), digital mobile communication network C judges whether or not digital portable telephone A is outside the service area, or is in an OFF state, i.e., its power is off. In this example, digital mobile communication network C judges that digital portable telephone A is outside the service area, or is turned OFF (step S405). Once the results of this judgment are obtained, digital mobile communication network C transmits a CALL PROC signal to digital portable telephone B (step S406).

Next, digital mobile communications network C judges whether or not the telephone number of digital portable telephone A has been registered as a telephone number for which a telephone answering service is available, in the storage apparatus of the switching apparatus in digital mobile communications network C. In this example, the telephone number of digital portable telephone A is found to be stored in the switching apparatus. Upon obtaining this result, digital mobile communications network C transmits a PROG signal, indicating the telephone answering service is available, to digital portable telephone B (step S407). Since this means that a message may be stored in the telephone answering service, digital portable telephone B transmits a notice that the communications display information is ON to reception notifying apparatus 3 (step S408). Having received this notice, reception notifying apparatus 3 deletes the telephone number [031234568] of digital portable telephone A from storage apparatus 32 (step S409).

After that, a CONN signal is transmitted from digital mobile communication network C to digital portable telephone B. When the line is connected (step S410), the telephone answering service center in digital mobile communication network C replies (step S411). Reception notifying apparatus 3 deletes the telephone number of digital portable telephone A from storage apparatus 32, and transmits the voice guidance to the telephone answering service center (step S412). Consequently, the voice guidance is stored in the storage apparatus which is provided in the telephone answering service center.

When the transmission of voice guidance is finished, reception notifying apparatus 3 transmits information indicating that transmission is finished to digital portable telephone B (step S413). Having received this information, digital portable telephone B transmits a DISC signal to digital mobile communication network C, terminating communication as a result (step S414). After that, when sending or receiving is carried out between digital portable telephone A and digital mobile communication network C, a signal indicating that there is a message (for example, a signal for displaying "You have a new message 0301234567") is transmitted from digital mobile communication network C to digital portable telephone B once communication is completed.

In this way, in this embodiment, even if a mail is received when a digital portable telephone is outside the service area, or is turned off, it is possible for the user to know later that a mail has been received. Furthermore, if a call back service is used, the user can know the detail of the reception status.

2-5. RECEPTION NOTIFYING SEQUENCE WHEN RECIPIENT IS OUTSIDE SERVICE AREA AND NO TELEPHONE ANSWERING SERVICE IS AVAILABLE

In this embodiment, digital portable telephone A, which is an intended recipient is outside the service area, or is turned off, and no telephone answering service is available. That is, the telephone number of digital portable telephone A is not registered in the storage apparatus in digital mobile communication network C as a telephone number for which a telephone answering service is available. An explanation will now be made of the reception notifying sequence in this case with reference given to FIG. 6. Please note, however, that the sequence in FIG. 6 from the reception in mail system communication processing apparatus 2 to the transmission of a CALL PROC signal by digital mobile communication network C (steps S501–S506) is the same as that in steps S401–S406 (see FIG. 5) of the reception notifying sequence in the case where a telephone answering service is available. Accordingly, an explanation thereof will be omitted.

Digital mobile communication network C transmits a CALL PROC signal (step S506), and then judges whether or not the telephone number of digital portable telephone A is registered in the storage apparatus of the switching apparatus on digital mobile communication network C as a telephone number for which an answering service is available. In this example, a judgment is made that the telephone number is not registered. Once this result is obtained, digital mobile communication network C transmits a DISC signal and the information indicating that there is no response from the receiving user to digital portable telephone B (step S507). After that, information indicating that there is no response from the receiving user is transferred from digital portable telephone B to reception notifying apparatus 3. Reception notifying apparatus 3 detects the information indicating that there is no response, stores the telephone number in storage apparatus 32 of digital portable telephone B, and carries out a recalling operation at fixed intervals (step S508).

In this embodiment, in the same manner as in the preceding reception notifying service when a line is busy, there is no reply provided to the ALERT signal which indicates that the telephone number of digital portable telephone A is displayed on digital portable telephone B (see steps S108, S109), as shown in FIG. 2. As a result, the telephone number of digital portable telephone A is not deleted in reception notifying apparatus 3, and the calling operation is carried out again. When a reply to the ALERT signal is supplied to digital portable telephone B from digital mobile communication network C, the procedure goes to step S111 shown in FIG. 2, and the procedures from step S112 to step S118 are carried out.

In this way, in this embodiment, even if a telephone answering service is not available, and the digital portable telephone cannot be communicated with, it is possible for the user to know that a reception occurred because the recalling operation is carried out at fixed intervals. Furthermore, if a call back service is available, then the user can know the details of the reception status.

2-7. RECEPTION NOTIFYING SEQUENCE WHEN A CALL BACK SERVICE IS AVAILABLE.

In the preceding explanations, when reception occurs in mail system communication processing apparatus 2, the host side notifies digital portable telephone A. In contrast, this embodiment concerns a reception notification in response to an inquiry made by digital portable telephone A to the host side about the presence of any received mail. An explanation will now be made of the reception notifying sequence in this case with reference to FIG. 7.

First of all, digital portable telephone A carries out calling control, and transmits a CALL SETUP signal and information which indicates the sending number and that display is possible (displayable) to digital portable telephone B via digital mobile communication network C (steps S601, S602). Digital portable telephone B then transmits the reception notice and the telephone number [031234568] of digital portable telephone A to mail system communication processing apparatus 2 through reception notifying apparatus 3 (steps S603, S604).

Next, when mail system communication processing apparatus 2 detects the reception notice and the telephone number [031234568] of digital portable telephone A (step S604), mail system communication processing apparatus 2 accesses the mailbox corresponding to telephone number [031234568], and detects the reception condition of the mail. It then transmits the mail reception information which indicates the reception condition of the mail (step S605).

On the other hand, digital portable telephone B receives a CALL SETUP signal, and then transmits a CALL PROC signal to digital portable telephone A through digital mobile communication network C (steps S606, S607). Furthermore, digital portable telephone B transmits an ALERT signal to digital portable telephone A through digital mobile communication network C (steps S608, S609), and then transmits the information indicating that the on-line displaying information is "ON" to reception notifying apparatus 3 (step S610). When reception notifying apparatus 3 detects this information, it transmits a notice indicating "OFF-HOOK" to digital portable communications telephone B (step S611). Next, when digital portable telephone B, which receives the information, transmits a CONN signal to digital portable telephone A through digital mobile communication network C (steps S612, S613), the line (or the channel) is connected between digital portable telephones A and B.

Next, reception notifying apparatus 3 generates the voice guidance based on the mail reception information of step S605, and transmits the voice guidance to digital portable telephone A through digital portable telephone B and digital mobile communication network C (step S614). When the voice guidance is finished, a DISC signal is transmitted from digital portable telephone A to digital portable telephone B through digital mobile communication network C, thereby finishing the communication (steps S615, S616). After that, digital portable telephone B transmits the on-line displaying information "OFF" to reception notifying apparatus 3.

In this way, in this embodiment, it is possible to transmit a detailed e-mail reception status by voice, upon request of the user. As a result, it is possible for the user to find out details of the reception by voice once he has been notified that a message was received while his line was busy or unable to communicate.

3. MODIFICATION

This invention is not limited to the above-mentioned embodiments, but rather various modifications are possible as follows, for example.

(1) In the above-mentioned embodiments, voice guidance is generated for indicating how many mails have been received in the mailbox. However, the present invention is not limited to a voice guidance of these contents. Rather, the voice guidance may indicate a reasonable combination of factors such as the number of mail items, the sender, the transmission time, and so on. That is, the voice guidance may provide information about mail reception.

(2) In the above-mentioned embodiment, the voice synthesizing apparatus may be a play back apparatus that plays back a magnetic tape. That is, the voice synthesizing apparatus may A be an apparatus which can generate voice guidance.

(3) In the above-mentioned embodiment, the suspension of voice guidance in the reception refusal service is carried out by detecting information which indicates that the on-line display information is OFF, in reception notifying apparatus 3. However, the suspension of the voice guidance may be carried out by detecting information which indicates reception refusal in reception notifying apparatus 3. Furthermore, in the case where the suspension of the voice guidance is carried out by detecting information which indicates that the on-line display information is OFF, the information indicating reception refusal may be omitted.

(4) In the preceding embodiments, digital portable telephone A on the host side is fixed in place, so that it may be an ordinary telephone. That is, digital portable telephone A may be a communication apparatus which can communicate with digital portable telephone B through digital mobile communication network C. Furthermore, digital portable telephone A may be built into a reception notifying apparatus.

(5) In the above-mentioned embodiments, mail system communication processing apparatus 2 was explained using the example where the telephone number corresponding to the reception is outputted. However, it is also acceptable for the telephone number to be detected in reception notifying apparatus 3 by providing a storage means in reception notifying apparatus 3 which stores a correlation between the mail ID outputted from mail system communication processing apparatus 2 and the telephone number corresponding to the mail ID.

4. EFFECT OF THIS INVENTION

As mentioned above, according to this invention, it is possible to expand the applied area of the electronic mail reception notifying service nationwide by using the existing facilities. Furthermore, it is possible to provide a notification of mail reception status by voice. Furthermore, it is possible to prevent wasteful use of the facilities because voice guidance is suspended when the reception refusal has been set in the portable telephone on the user's side. Moreover, it is possible to provide notification of reception information with assurance by calling again in the cases where a portable telephone is busy or cannot communicate. Furthermore, it is possible to provide a notification of reception information upon inquiry from the user side.

What is claimed is:

1. A mail reception notifying system comprising:

(a) a reception notifying apparatus that, when there is a mail to be delivered to a user, initiates a notifying call to a telephone number registered in relation to the user and, when the notifying call is answered, sends to the telephone number a message carrying information on the mail to be retrieved;

(b) a communication network that determines whether the telephone number is receptive to a call and progresses, if it is determined receptive, the notifying call to the telephone number in order to convey the message to the telephone number; and (c) a portable telephone having the telephone number that is responsive to the notifying call while on-hook to visually notify the user that there is a mail to be retrieved and, when brought off-hook to answer the notifying call, acoustically notifies the user of the mail to be retrieved by reproducing the message by sound.

2. A mail reception notifying system according to claim 1, further comprising a mail communication processing apparatus that receives mails for users who are registered therein in relation to their telephone numbers, wherein when receiving a mail to one of the users, the mail communication processing apparatus provides the reception notifying apparatus with information on the telephone number of the one of the users and the mail to be delivered to the one of the users.

3. A mail reception notifying system according to claim 2, wherein the reception notifying apparatus comprises a storage device that stores the information on the telephone number provided from the all communication processing apparatus, and a deleting device that deletes the information stored in the storage device after recognizing that the portable telephone has received the notifying call to visually notify the user that there is a mail to be delivered.

4. A mail reception notifying system according to claim 1, wherein users are registered in the reception notifying apparatus in relation to their telephone numbers.

5. A mail reception notifying system according to claim 1, wherein the mail is at least one mail selected from the group of an e-mail, a voice mail and a facsimile mail.

6. A mail reception notifying system according to claim 1, wherein the number is determined unreceptive to a call when the portable telephone is in use, turned off or located outside a service area.

7. A mail reception notifying system according to claim 6, wherein when the telephone number is determined unreceptive to a call, the reception notifying apparatus will initiate the notifying call at fixed intervals until the telephone number becomes receptive.

8. A mail reception notifying system according to claim 1, wherein the portable telephone can be set unreceptive to calls from particular callers.

9. A mail reception notifying system according to claim 8, wherein if the portable telephone is set to be unreceptive to notifying calls from the reception notifying apparatus, the notifying calls are discontinued after the portable telephone visually notifies the user that there is a mail to be retrieved.

10. A mail reception notifying system according to claim 1, wherein when the telephone number is determined unreceptive to a call, but if a telephone answering service is available for the telephone number, the reception notifying apparatus uses the telephone answering service to deliver the message to the telephone number.

11. A mail reception notifying system according to claim 1, wherein the portable telephone initiates an inquiring call to the reception notifying apparatus, and the reception notifying apparatus in return sends the message to the portable telephone when there is a mail to be delivered to the user.

12. A mail reception notifying method using a portable telephone that can be communicated with over a communication network, comprising the steps of:

(a) initiating a notifying call to the portable telephone when there is a mail to be delivered to a user who has the portable telephone;

(b) determining at the communication network whether or not the portable telephone is receptive to a call;

(c) progressing the notifying call to the portable telephone if it is determined receptive to a call;

(d) in response to the notifying call, visually notifying the user at the portable phone while on-hook that there is a mail to be retrieved;

(e) when the portable telephone is brought off-hook to answer the notifying call, sending to the portable telephone a message carrying information on the mail to be retrieved; and (f) acoustically notifying the user at the portable telephone of the mail to be retrieved by reproducing the message by sound.

13. A mail reception notifying method according to claim 12, wherein the mail is at least one mail selected from the group of an e-mail, a voice mail and a facsimile mail.

14. A mail reception notifying method according to claim 12, wherein the portable telephone is determined unreceptive in the above step (b) when the portable telephone is in use, turned off or located outside a service area.

15. A mail reception notifying method according to claim 14, further including the step of initiating the notifying call when the portable telephone is determined unreceptive to a call until it becomes receptive.

16. A mail reception notifying method according to claim 12, wherein if a telephone answering service is available for the portable telephone, the method includes the step of using the telephone answering service to deliver the message to the portable telephone if the portable telephone is determined unreceptive to a call in the above step (b).

17. A mail reception notifying method according to claim 12, further including the steps of sending an inquiring call from the portable telephone and sending, in return, the portable telephone the message carrying information on the mail to be retrieved if any.

18. A mail reception notifying method using a portable telephone that can be set unreceptive to calls from particular callers, comprising the steps of:

(a) initiating a notifying call to the portable telephone when there is a mail to be delivered to a user who has the portable telephone;

(b) in response to the notifying call, visually notifying the user at the portable telephone while on-hook that there is a mail to be retrieved;

(c) discontinuing the notifying call if the portable telephone is set unreceptive to calls from a caller of the notifying call;

(d) if the portable telephone is set receptive to calls from the caller of the notifying call, sending to the portable telephone a message carrying information on the mail to be retrieved when the portable telephone is brought off-hook to answer the notifying call; and (f) acoustically notifying the user at the portable telephone of the mail to be retrieved by reproducing the message by sound.

* * * * *

UNITED STATES PATENT AND TRADEMARK OFFICE
CERTIFICATE OF CORRECTION

PATENT NO. : 6,587,681 B1
DATED : July 1, 2003
INVENTOR(S) : Koichi Sawai

It is certified that error appears in the above-identified patent and that said Letters Patent is hereby corrected as shown below:

<u>Title page,</u>
Item [51], insert a new item as follows:
-- [30] Foreign Application Priority Data
   March 13, 1996      (JP)    8-56,307 --.

<u>Column 16,</u>
Line 10, delete "(f)" and substitute -- (e) -- in its place.

Signed and Sealed this

Thirteenth Day of January, 2004

JON W. DUDAS
*Acting Director of the United States Patent and Trademark Office*